United States Patent

Schultz

[11] 3,908,860
[45] Sept. 30, 1975

[54] FEEDER AND DRIVE TRACK
[75] Inventor: George E. Schultz, Clearwater, Fla.
[73] Assignee: Tangen Drives, Inc., Clearwater, Fla.
[22] Filed: Apr. 11, 1973
[21] Appl. No.: 350,163

Related U.S. Application Data
[63] Continuation-in-part of Ser. No. 254,888, May 19, 1972, abandoned.

[52] U.S. Cl. ............................. 221/161; 198/278
[51] Int. Cl. ............................................ B63q 7/12
[58] Field of Search ................. 198/33 AA, 278; 221/156–163, 173, 167, 178–180, 182

[56] References Cited
UNITED STATES PATENTS

| | | | |
|---|---|---|---|
| 1,779,866 | 10/1930 | Wilcox | 221/162 |
| 1,973,720 | 9/1934 | Lockie | 221/167 X |
| 2,665,005 | 1/1954 | Mundy | 221/160 |
| 2,699,868 | 1/1955 | Bailey | 221/163 |
| 3,063,543 | 11/1962 | Schneider | 221/159 X |
| 3,119,487 | 1/1964 | Wyle | 198/33 AA |

*Primary Examiner*—Robert B. Reeves
*Assistant Examiner*—Thomas E. Kocovsky
*Attorney, Agent, or Firm*—Dominik, Knechtel, Godula & Demeur

[57] ABSTRACT

A feeder and driven track is shown, the feeder being of the character that has a rotary cone driven at its central portion surrounded by a circumferential feeder wall. A pickup assembly is provided at one side of the unit along the wall and may optionally pick up parts tumbled within the feeder for delivery in single file or a waterfall-type delivery to a pair of parallel counter-rotating driven feeder rolls. The feeder rolls are supported at each end by a space adjustment which, at one end or the other or both ends of the track assembly, may vary the spacing between the counter-rotating feeder rollers. The adjustment of the spacing of the feeder rolls contemplates a crotch hanger assembly and a threaded shaft, reversely threaded at opposed portions, and reversely threaded nuts which are secured to two legs of the crotch hanger assembly thereby permitting, by the rotating of a single threaded shaft, the opposed spacing apart or closer together of the counter-rotating rolls. In one embodiment, hangers are provided extending downwardly from a backplate so that the counter-rotating rollers are positioned at the lower extremities of the hanger, and therefore any parts passing over the rollers have an uninterrupted downward path which assists in sizing, orientation, stabilizing, speed of feed, and flexibility in the orientation and positioning of the driven track assembly.

3 Claims, 12 Drawing Figures

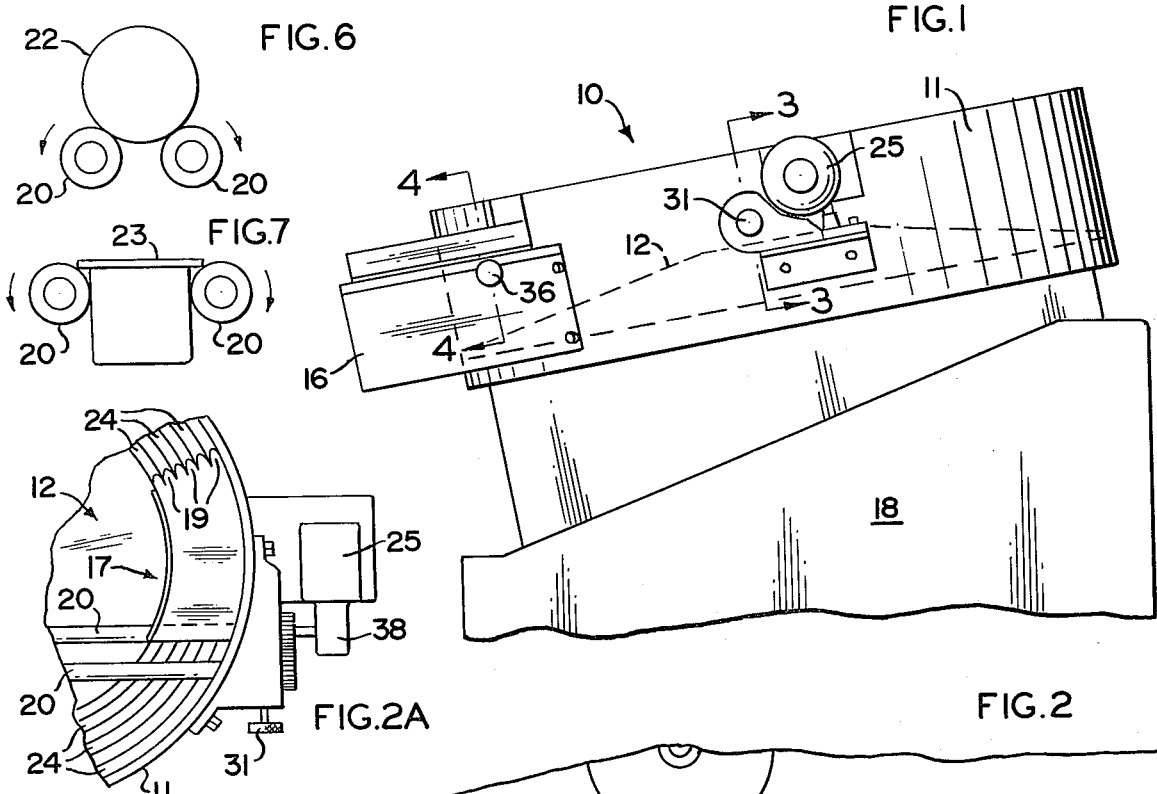
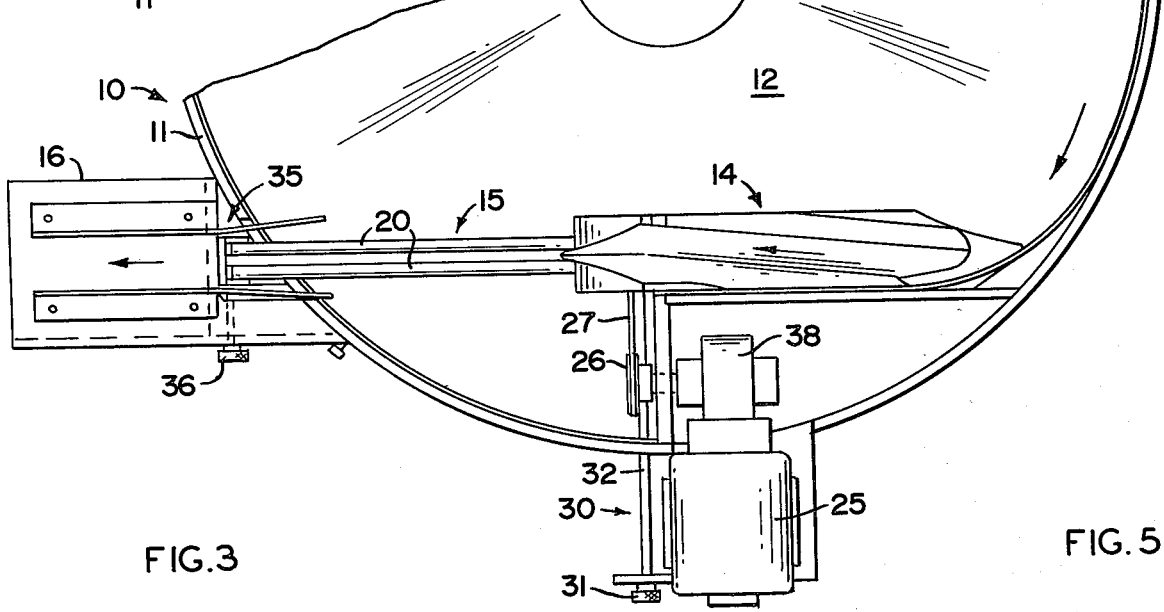
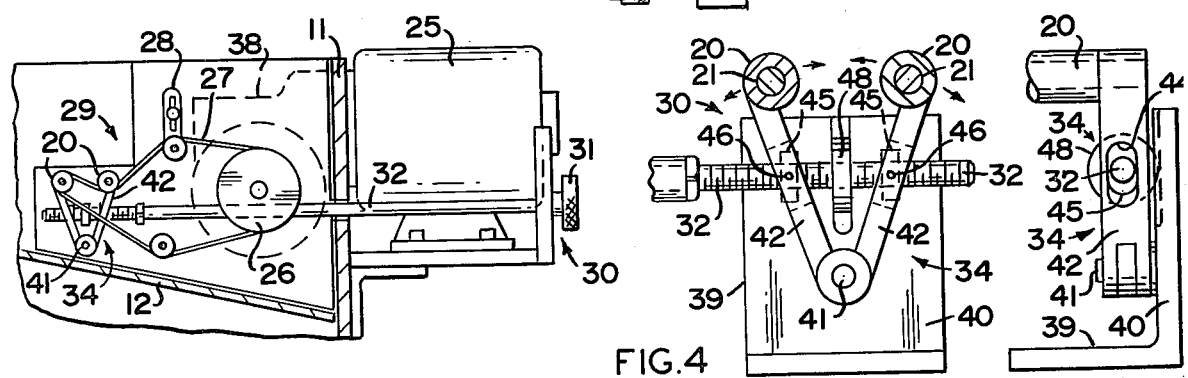

FEEDER AND DRIVE TRACK

CROSS REFERENCE TO RELATED APPLICATIONS

This application constitutes a continuation in part of applicant's previously filed application Ser. No. 254,888 filed May 19, 1972 now abandoned.

BACKGROUND OF INVENTION

The present invention relates to one type of pickup and feed track which can be employed in a feeder using a driven rotary conical member surrounded by a peripheral feeder wall. Such products are marketed by Tangen Drives, Inc., assignee of the subject application, under the trademark CENTRIFEED feeders. Varying forms of tooling have been employed with the subject feeders to orient the parts delivered at the peripheral wall of the unit. Such are shown in co-pending U.S. patent applications Ser. No. 87,806 and 145,632. Also counter-rotating rolls are known such as shown in U.S. Pat. No. 3,313,410 which serve to accomplish a primarily sizing operation on various tapered parts.

DESCRIPTION OF THE PRIOR ART

Vibratory feeders of the character disclosed in U.S. Pat. Nos. 2,662,192 and 2,535,050 are normally limited to feed rates of anywhere from 50 to 250 parts per minute within the practical ranges of operation. Feeders of the rotary cone type can, of course, accomplish faster speeds since the part travels at approximately the speed of the periphery of the rotary cone. However, once the part is delivered from the cone to a track, to maintain the same speed, pneumatic blowers and the like may have to be employed, or the parts have to be quickly oriented and removed to a magazine or other form of feed. The pneumatic acceleration often results in the piling up of parts and can further cause loss of orientation.

SUMMARY OF INVENTION

The invention is directed to the provision of a pair of counter-rotating rollers, the parallel spacing of which may be adjustable or adjusted while the same are rotating and the feeder is operating. In one embodiment, the counter-rotating driven rollers are suspended at the lower portion of hangers secured to a backplate to thereby provide an uninterrupted downward path for the orientation and feeding of parts and to further insure greater flexibility in positioning with regard to the rotary feeder. Both a single file-type pickup assembly as well as a cascade or waterfall-type assembly for 90 degree presentation of the parts to the counter-rotating rollers are contemplated. The driven track is oriented at a position more than one-half a radius away from the center of the rotary cone of the host feeder mechanism, and the pickup assembly is also preferably oriented at at least one-half a radius from the center of the rotary cone. An independent drive mechanism is provided for the counter-rotating rollers with a drive assembly that permits some flexibility in the ultimate speed of rotation of the counter-rotating rollers.

It is one of the principal objects of the present invention to provide a driven track which will serve the twofold purpose of rapidly advancing parts and also orienting the same where their configuration permits such orientation as with tapered shapes, or when a lip or rim is provided at the upper portion of the part.

It is a further object of the present invention to provide a driven track of counter-rotating rollers which, because of an uninterrupted downward path, can handle long tapered parts, and also can be positioned outside the feeder or inside the feeder depending upon the particular application.

Still another object of the present invention, because an uninterrupted downward path is provided between the rollers, the rollers can be of a considerably greater length including penetration within the feeder to thereby insure a greater speed of feed.

Still another object of the present invention is to provide a live track with counter-rotating driven rollers which can be prefabricated and made from specially tooled parts and readily adjusted to adapt itself to a wide variety of parts thus reducing the cost by having a standard feeder track available for automating a wide variety of feeder applications.

DESCRIPTION OF ILLUSTRATIVE DRAWINGS

Further objects and advantages and a better understanding of the invention will take place as the following description of an illustrative embodiment proceeds, taken in conjunction with the accompanying drawings in which:

FIG. 1 is a front elevation, partially broken, of a feeder and drive track illustrative of the present invention.

FIG. 2 is a top or plan view of the feeder and driven track assembly shown in FIG. 1, the same being broken to show only approximately half of the feeder mechanism, since the pickup and track mechanism are on one side of the unit.

FIG. 2A is a view similar to FIG. 2 showing an alternative pickup mechanism.

FIG. 3 is a transverse sectional view slightly enlarged and broken showing the drive mechanism for the driven track generally along section line 3—3 of FIG. 1.

FIG. 4 is an enlarged, partially broken view of the adjustable support mechanism for the driven rollers taken along section line 4—4 of FIG. 1, and slightly enlarged.

FIG. 5 is a side elevation of the support mechanism shown in FIG. 4.

FIG. 6 is a diagrammatic showing of the counter-rotating rolls, feeding a cylindrical part.

FIG. 7 is a diagrammatic view comparable to that shown in FIG. 6 showing the feeding of a lipped part.

DESCRIPTION OF FIRST EMBODIMENT

Figure 8:
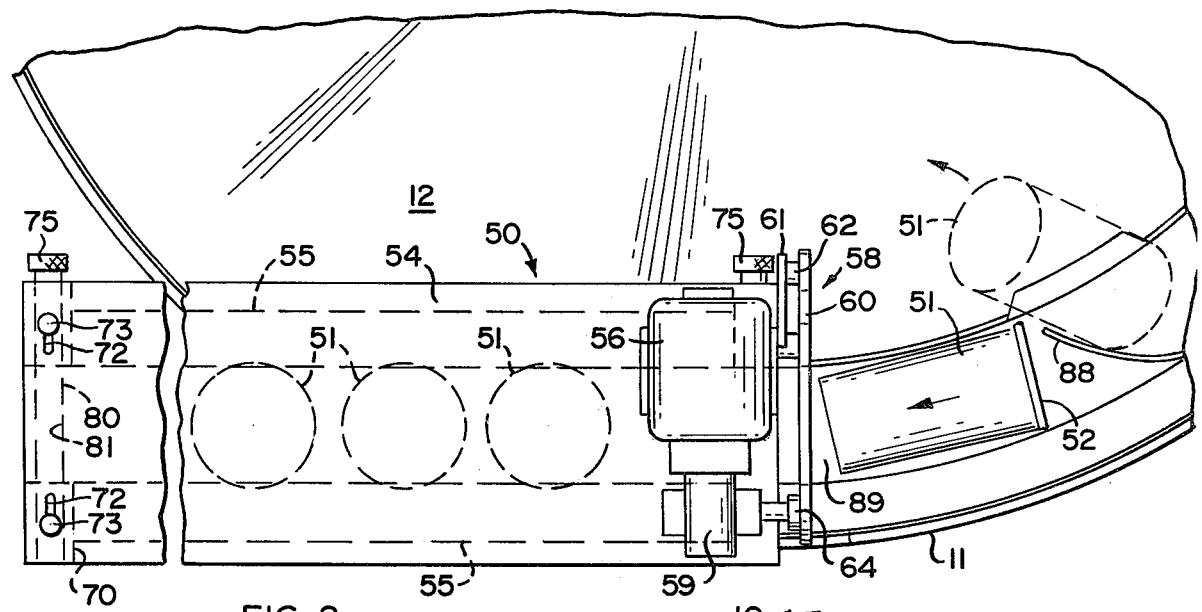
FIG. 8 is a plan view, partially broken, of an alternative embodiment feeder with driven tracks in which the tracks are suspended beneath a backplate, and define an uninterrupted downward central path.

The feeder and driven track 10 as illustrated particularly in FIGS. 1 and 2 will be noted to include as its principal moving element a rotary cone 12, surrounded by a feeder wall 11. Feeders of this character are sold by Tangen Drives, Inc. of Clearwater, Florida, under the trademark CENTRIFEED feeders. The rotary cone 12 is driven by a separate motor, not shown herein, and usually is supported on a tilt support 18 such as illustrated in FIG. 1 which permits the entire rotary cone 12 to have its axis of rotation tilted with regard to the vertical depending upon the optimum angularity for the particular parts being fed.

As shown in FIG. 2, the pickup assembly 14 is a longitudinal V-shaped member which picks up parts single file from a position adjacent the feeder wall 11. Optionally shown in FIG. 2A is a waterfall pickup assembly 17. The latter is positioned adjacent the feeder wall 11 also, but the parts move up the ramp portion of the waterfall pickup assembly 17, and drop several at a time along the track assembly 15, rather than one at a time as is accomplished with the pickup assembly 14 shown in FIG. 2 of the drawing. A plurality of figers 19 are provided on the waterfall pickup assembly 17 to mate with a plurality of grooves 24 in the rotary cone 12.

As discussed in the statement of invention and the objects, many parts, particularly if made of paper or materials other than metallic or smooth plastic, will not feed at the rates to which the feeder 10 and rotary cone 12 are capable of delivering parts. It is with this speed feed in mind that the power track assembly 15 is provided with a pair of counter-rotating rollers 20, the same being supported in bearings 21 (see FIG. 4) for counter rotation and adjustability of the parallelism of the rollers 20.

As noted in FIG. 2, the counter-rotating rollers 20 of the track assembly 15 are driven by a motor 25 through a gear box 38 and thence to a primary pulley 26. As will be better seen in FIG. 3, the primary pulley 26 drives a belt 27 which is threaded through a plurality of pulleys on a reverse drive assembly 29 to the end that the rollers will counter-rotate centrally and upwardly as illustrated by the diagrammatic arrows in FIGS. 6 and 7. A suitable tension adjustment assembly 28 is provided in the reverse drive assembly 29 which also permits the interchangeability of the primary pulley 26 to accomplish various speeds of counter rotation of the rollers 20.

When the feeder and driven track assembly 10 is operating, depending upon the type of part, and feed rate, it becomes desirable to adjust the parallel relationship of the counter-rotating rollers 20. To this end a feed end space adjustment assembly 30 is provided, with a comparable unit at the discharge end of the counter-rotating tracks, shown as a discharge end space adjustment assembly 35. Each of the adjustment assemblies is operated by a knurled knob, shown in FIG. 2 as a feed end adjustment knob 31, and discharge end adjustment knob 36.

Since both of the mechanisms of the spacing adjustment are the same, only one will be described particularly with reference to FIGS. 4 and 5. In FIG. 4 it will be seen that a support bracket 39 is provided with an upstanding leg 40 to which a pivot pin 41 is secured. The single pivot pin pivotally receives the lower ends of legs 42 of the crotch hanger assembly 34. Each of the legs 42 is provided at a mid-portion with a nut aperture 44 (see FIG. 5) and each nut 45 is secured to the crotch leg 42 by means of the nut mounting pin 46. The threaded shaft 32 is provided at one portion with a left-hand thread, and at the opposite portion with a right-hand thread, and each of the crotch leg spacing nuts 45 is respectively lefthand and righthand. The upper ends of the crotch legs 42 rotatably journal the driven rollers 20. A central hanger 48 is provided and contains a collar (not shown) or other suitable means for restraining the threaded shaft 32 against longitudinal motion. Thus is operation, when the space between the parallel rotary shafts 20 is to be varied, the threaded shaft 32 is rotated by either of the adjustment knurled knobs 31, 36, and the spacing adjusted pragmatically to achieve the best rate of speed and orientation of the parts.

Illustrative of the type of parts are a round or cylindrical part 22 such as shown in FIG. 6, and a lipped part 23 such as shown in FIG. 7. Of the parts particularly advantageously fed and oriented with a unit of this type are paper waxed tampon containers, and also metallic lamp bases.

In review it will be seen that a feeder and driven track assembly 10 has been shown in which the discharge track assembly provides a high speed and adjustable discharge track and/or orientation by means of a pair of powered counter-rotating rollers 20. Alternative embodiments are shown of a single file pickup assembly 14 and an alternative waterfall or cascade-type pickup 17. The waterfall pickup 17, because of the 90 degree change in direction, and the plurality of parts presented to the counter-rotating rollers 20, is susceptible of significantly higher feed rates that that of the single part pickup assembly 14. Assemblies are provided at both ends of the counter-rotating tracks 20 to adjust their parallel spacing, each such assembly being independently adjustable by means of a feed adjustment knob 31, 36. In addition, a drive assembly including a reverse drive 20 is belt driven off a motor 25 by means of a changeable pulley 26 which, in conjunction with the tension assembly 28, permits varying the speed of rotation of the counter-rotating rollers, as well as the spaced parallel relationship of the counter-rotating rollers.

DESCRIPTION OF SECOND EMBODIMENT

Figure 11:
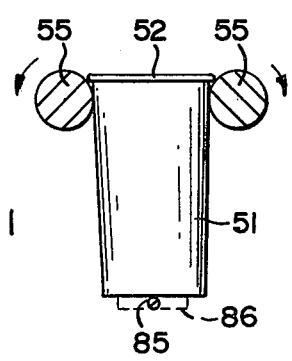
FIG. 11 is a transverse sectional partially diagrammatic view taken along section line 11—11 of FIG. 9 illustrating the driving relationship between a part, the driven rollers and in this instance, a stabilizing member.

A second embodiment of the present invention also employs a rotary cone type feeder such as shown in top view or plan view in FIG. 8, wherein the rotary cone 12 is surrounded by a feeder wall 11. The suspended track assembly 50 is positioned at a tangent point along the wall 11 and in this instance, as shown in FIG. 11 in particular, is provided for feeding a cup 51 which has a tapered body terminating at its upper portion in a lip 52. As shown in FIG. 8, the cups 51 are circulated atop the rotary cone 12, and against the side wall 11 and are delivered upwardly by means of a feed chute 89, those parts not being proper oriented for delivery to the suspended track assembly 50 being discharged by means of the wiper 88, and as shown in the phantom lines at the right hand portion of FIG. 8.

The suspended track assembly 50 has as its backbone or frame a base plate 54 from which the rollers 55 are suspended by means of the roller hangers 70. A motor 56 is mounted atop the base plate 54, and secured to the base plate by means of a motor mount 71 or bracket suitably proportioned for securing the motor 56 to the base plate 54. The drive assembly 58 contemplates a gear box 59 secured directly to the motor 56, and a belt 60 which is reaved through a plurality of pulleys including a drive pulley 64 on the motor 56, and idle pulley 62 on the idler bar 61, and roller pulleys 65 secured in driving relationship to the rollers 55. As will be observed in FIG. 10, the drive assembly 58, as shown by the arrows, provides through the belt 60 a means for counter rotating the driven rollers 55. To assure the proper tension in the belt 60, the idle pulley 62 is mounted on the idler bar 61 which has a mounting slot 66, the same being secured to one of the hangers 70 by means of the idler bracket bolt 68 which permits adjustment, and tightening of the bolt 68 to secure the proper tension in the belt 60.

Figure 9:
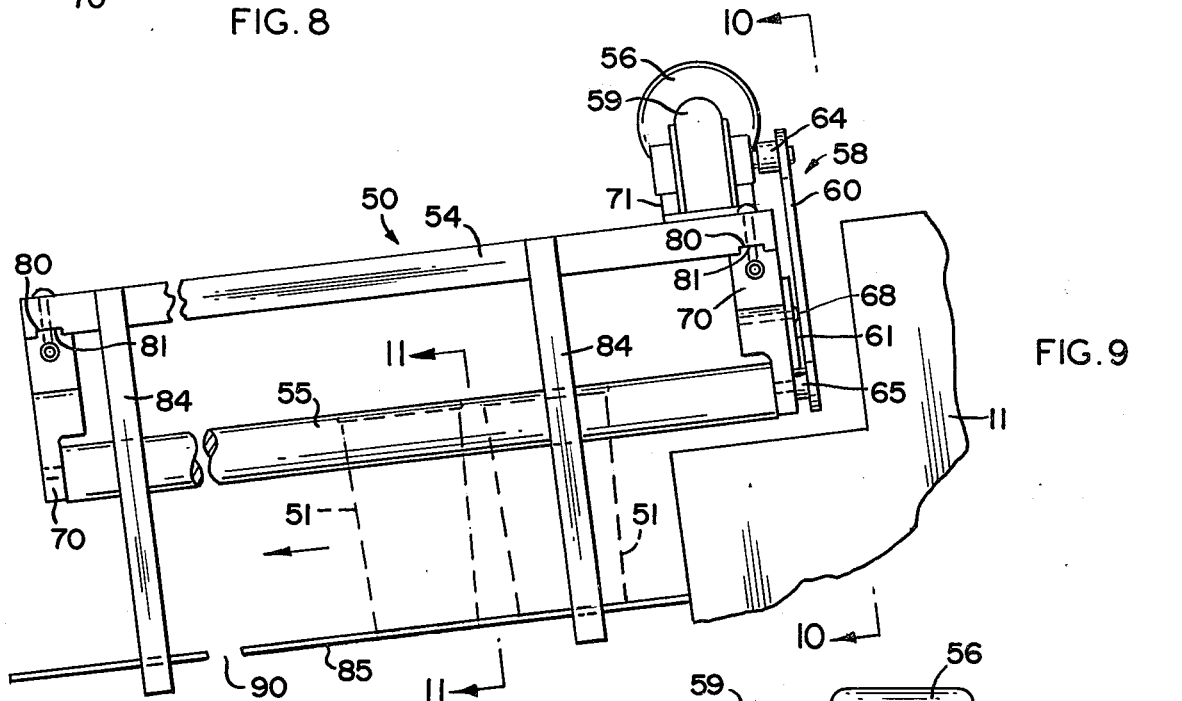
FIG. 9 is a front elevation taken in the same scale as that of FIG. 8, showing the feeder wall partially broken.
Figure 10:
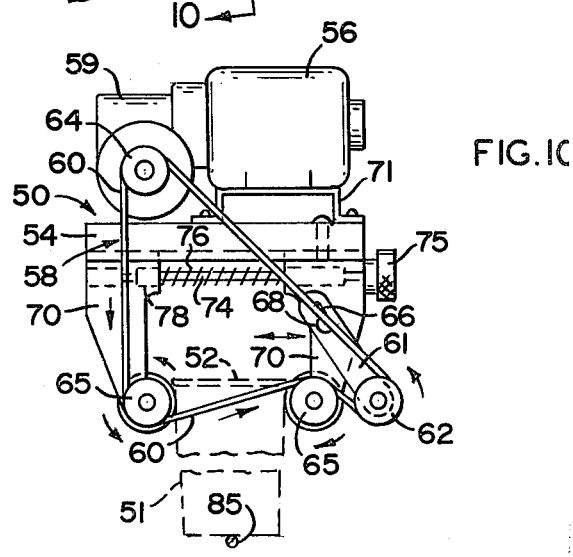
FIG. 10 is an end view in reduced scale taken along section line 10—10 of FIG. 9 showing the power driven end of the track assembly.

The hangers 70 are suspended downwardly beneath the base plate 54 by means of hanger mounting bolts 73 which pass through the hanger adjusting slots 72 in the base plate 54. Spacer screws 74 which are actuated by knurled spacer screw knobs 75, pass through the opposed hangers 70, particularly as illustrated in FIG. 10. By rotating the knobs 75, the far spacer screw thread 78 engages the opposed hangers 70, and after loosening the appropriate hanger bolt 73, the same may be drawn into closer proximity against the action of the hanger screw spring 76. When the proper spacing adjustment has been achieved between the rollers 55, the hanger bolts 73 are again tightened and the spacing is assured. The spacing is further guided by means of the hanger key provided at the top of the hangers (see particularly FIG. 9) which mates with a hanger key slot 81 provided transversely in the base plate 54. Thus, when the bolts 73 are tightened, they not only secure the hangers 70 against lateral movement, but coact with the key in slot combination 80, 81 to secure the same in that configuration.

In many instances it is desired to reject either undersized parts, or ovate parts. Such a rejection may be desired outside of the feeder assembly so that the parts can be either scrapped, or reworked. Under these circumstances, the uninterrupted opening beneath the rollers 55 (See FIG. 11) will permit such a dropping out. The face that the driven rollers 55 are constantly working against the part accelerates the rotation of an ovate part so that its minor axis is across the span between the rollers 55, and it will be promptly rejected. As to undersized parts, the same phenomenon occurs without the necessity of rotating the part. If such a dropout is desired immediately upon the exit from the feeder, any stabilizing rail or stabilizing flat has an interrupted portion closely adjacent to the feeder. In the present instance, the showing illustrates a stabilizer rail stirrup 84 (see FIG. 9) a pair of which are secured to the sides of the base plate 54 and extend downwardly and underneath the unit. Positioned centrally of the bottom portion of the stirrup 84 is a stabilizer rail 85, illustrated in solid lines in FIG. 11. Alternatively it may be desired to position a stabilizing flat 86, such as shown in dotted lines in FIG. 11. In practice it has been determined that the stabilizing rail increases the feed rate by orienting the part more rapidly in its position on the rollers 55.

As pointed out above, a discharge gap 90 (see FIG. 9) may be provided at any particular location for the dropping out of parts which are undersized or ovate. Where the discharge gap 90 is between the stirrups 84, this permits stabilization of the parts prior to passing over the discharge gap, and further insuring that the ovate parts which may not be completely oriented with their minor axes across the rollers 55 are so oriented prior to passing the discharge gap 90.

A particular advantage of the suspended track assembly 50 becomes apparent from the present showing where it will be seen that the same is partially inside the feeder and partially outside the feeder. It would be appreciated, of course, that the feed chute 89 may be extended outside the feeder assembly, and yet the same suspended track assembly 55 can be positioned there. This is particularly desirable where a part has a length significantly greater than its diameter and will hang down quite a distance beneath the driven rollers 55. Alternatively, since the lowermost portion of the unit, when a stabilizing rail 85 is not employed, is the lower portion of the hangers 70, it will be appreciated that the suspended track assembly 50 may be positioned almost entirely within the feeder, only providing for a discharge outside the feeder at its far end for dropping the thus oriented parts into a magazine, or otherwise delivering the same for further processing.

Although particular embodiments of the invention have been shown and described in full here, there is no intention to thereby limit the invention to the details of such embodiments. On the contrary, the intention is to cover all modifications, alternatives, embodiments, usages and equivalents of a feeder and driven track as fall within the spirit and scope of the invention, specification and the appended claims.

What is claimed is:

1. A feeder and driving track for parts comprising, in combination, a rotary conical feeding member, its vertical axis extending upwardly, a feeder wall surrounding said rotary conical feeding member, and extending thereabove, means for driving said rotary conical member, pickup plow means positioned tangentially on said rotary conical member for receiving individual parts driven circumferentially around said feeder by said rotary conical member for elevating the parts to a drop off end, and, driven track feeding and delivery means including
 a. counter-rotating driven rollers, and
 b. means for driving said counter-rotating driven rollers, and,
 c. means positioning said rollers above the rotary conical member more than half the distance from the vertical axis to the feeder wall and beneath the drop off ends of pickup plow means, and said pickup plow being a waterfall type having a generally flat body portion, said waterfall pickup terminating in a longitudinal edge approximately parallel to and above the spaced counter-rotating driven rollers, a plurality of grooves in the periphery of said rotary conical driven member, a plurality of fingers at the pickup portion of said waterfall cascade type plow, the fingers and grooves being proportioned and oriented to position themselves in close proximate relationship, whereby said counter-rotating driven rollers will receive individual parts from said pickup assembly and deliver the same in floating fashion oriented between said rollers to a delivery point at the far end of the rotating driven rollers remote from said pickup assembly.

2. In the feeder and driven track mechanism of claim 1, a crotch assembly for providing the spacing between said counter-rotating rollers including, a single threaded shaft having oppositely threaded spaced portions, a crotch assembly having a pair of legs pivoted at a lower portion thereof, oppositely threaded nut members threaded to the oppositely threaded portions of said shaft, and pinned to the legs of said crotch assembly, and, means for rotatably supporting one end of each of the rollers in the portion of said crotch members remote from the means whereby the same are pivoted.

3. In the feeder and driven track assembly of claim 1, hanger means for suspending said counter-rotating driven rollers defining an uninterrupted pathway for parts suspension beneath the opposed driven rollers, a crotch assembly for providing the spacing between said counter-rotating rollers including, a single threaded shaft having oppositely threaded spaced portions, a crotch assembly having a pair of legs pivoted at a lower portion thereof, oppositely threaded nut members threaded to the oppositely threaded portions of said shaft, and pinned to the legs of said crotch assembly, and, means for rotatably supporting one end of each of the rollers in the portion of said crotch members remote from the means whereby the same are pivoted.

* * * * *